US009110890B2

(12) United States Patent
Cannon et al.

(10) Patent No.: US 9,110,890 B2
(45) Date of Patent: Aug. 18, 2015

(54) SELECTING A LANGUAGE ENCODING OF A STATIC COMMUNICATION IN A VIRTUAL UNIVERSE

(75) Inventors: Ulysses L. Cannon, Durham, NC (US); Angela Richards Jones, Durham, NC (US); Ruthie D. Lyle, Durham, NC (US); Susan S. McVey, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1203 days.

(21) Appl. No.: 12/032,530

(22) Filed: Feb. 15, 2008

(65) Prior Publication Data
US 2009/0210213 A1 Aug. 20, 2009

(51) Int. Cl.
G06F 17/28 (2006.01)
G06F 17/22 (2006.01)
G06N 3/00 (2006.01)
A63F 13/00 (2014.01)

(52) U.S. Cl.
CPC .......... *G06F 17/289* (2013.01); *G06F 17/2288* (2013.01); *A63F 13/00* (2013.01); *G06N 3/006* (2013.01)

(58) Field of Classification Search
CPC ........ G06N 3/004; G06N 3/006; A63F 13/00; A63F 17/289
USPC ........................ 704/227, 2; 709/218; 715/758
See application file for complete search history.

(56) References Cited

U.S. PATENT DOCUMENTS

| 4,615,002 A * | 9/1986 | Innes ................................. 704/8 |
| 4,635,199 A | 1/1987 | Muraki |
| 5,884,029 A * | 3/1999 | Brush et al. .................... 709/202 |
| 6,219,045 B1 * | 4/2001 | Leahy et al. ................... 715/757 |
| 6,397,080 B1 | 5/2002 | Viktorsson et al. |
| 6,453,294 B1 | 9/2002 | Dutta et al. |
| 6,784,901 B1 | 8/2004 | Harvey et al. |
| 6,957,425 B1 | 10/2005 | Nadon et al. |
| 6,961,929 B1 | 11/2005 | Pelegri-Llopart et al. |
| 7,092,952 B1 | 8/2006 | Wilens |
| 7,117,479 B2 | 10/2006 | Van De Vanter |
| 7,257,527 B2 * | 8/2007 | Ertemalp et al. ................... 704/2 |
| 7,319,992 B2 * | 1/2008 | Gaos ............................... 706/62 |
| 7,468,729 B1 | 12/2008 | Levinson |

(Continued)

FOREIGN PATENT DOCUMENTS

WO    WO 97/18516    *  5/1997

OTHER PUBLICATIONS

U.S. Appl. No. 11/845,178, filed Aug. 27, 2007.

(Continued)

*Primary Examiner* — Daniel Abebe
(74) *Attorney, Agent, or Firm* — DeLizio Law, PLLC

(57) ABSTRACT

A static communication can be presented efficiently in different languages to facilitate propagation of the static communication across language boundaries. A static communication object that represents a static communication can be loaded with different language encodings of the static communication. When a trigger occurs (e.g., an avatar accesses the static communication object), a language encoding of the static communication that can be understood by the avatar is presented to the avatar. As the static communication propagates throughout the virtual universe, additional language encodings can be added to the static communication object.

20 Claims, 7 Drawing Sheets

(56) References Cited

U.S. PATENT DOCUMENTS

| | | | |
|---|---|---|---|
| 7,797,168 | B2 | 9/2010 | Kusumoto et al. |
| 7,809,789 | B2* | 10/2010 | Shuster .......... 709/203 |
| 2003/0028261 | A1 | 2/2003 | Peterson et al. |
| 2003/0028621 | A1 | 2/2003 | Furlong et al. |
| 2003/0078972 | A1 | 4/2003 | Tapissier et al. |
| 2003/0144922 | A1 | 7/2003 | Schrantz |
| 2003/0146926 | A1* | 8/2003 | Valdes .......... 345/703 |
| 2003/0220972 | A1 | 11/2003 | Montet et al. |
| 2004/0078762 | A1* | 4/2004 | Lee et al. .......... 715/536 |
| 2004/0193441 | A1 | 9/2004 | Altieri |
| 2005/0034079 | A1 | 2/2005 | Gunasekar et al. |
| 2005/0267826 | A1 | 12/2005 | Levy et al. |
| 2006/0028475 | A1 | 2/2006 | Tobias |
| 2006/0184355 | A1 | 8/2006 | Ballin et al. |
| 2006/0206310 | A1 | 9/2006 | Ravikumar et al. |
| 2006/0224438 | A1* | 10/2006 | Obuchi et al. .......... 705/10 |
| 2006/0293889 | A1 | 12/2006 | Kiss et al. |
| 2007/0050716 | A1 | 3/2007 | Leahy et al. |
| 2007/0055490 | A1 | 3/2007 | Gunasekar et al. |
| 2007/0168359 | A1 | 7/2007 | Jacob et al. |
| 2007/0176921 | A1 | 8/2007 | Iwasaki et al. |
| 2007/0233839 | A1* | 10/2007 | Gaos .......... 709/223 |
| 2008/0004116 | A1 | 1/2008 | Luchene et al. |
| 2008/0097822 | A1 | 4/2008 | Schigel et al. |
| 2008/0221892 | A1 | 9/2008 | Nathan et al. |
| 2008/0263458 | A1 | 10/2008 | Altberg et al. |
| 2009/0058862 | A1 | 3/2009 | Finn et al. |
| 2009/0089685 | A1 | 4/2009 | Mordecai et al. |
| 2009/0099836 | A1* | 4/2009 | Jacobsen et al. .......... 704/3 |
| 2009/0210803 | A1 | 8/2009 | Brignull et al. |

OTHER PUBLICATIONS

Seebach, Peter "Adding simple translation to Second Life", http://www.ibm.com/developerworks/library/l-second-life-3.html,(Apr. 30, 2007).

Barr, Pippin et al., "Changing The Virtual Self", http://www.mcs.vuw.ac.nz/chikken/research/papers/cgie2006/TransformingVirtualSelf.pdf,8.

Exchange, SL "Multi-Lingo Translator V6.0", http://www.slexchange.com/modules.php?name=Marketplace&file=item&ItemID=410274,(2007).

Wessel, Kraaij et al., "Embedding Web-based Statistical Translation Models in Cross-Language", *CoRR*, cs.CL/0312008,(2003).

Boitet, P. et al., "Present and Future Paradigms in the Automated Translation of Natural Languages".

Thiemann, Peter "An Embedded Domain-Specific Language for Type-Safe Server-Side Web-Scripting", www.informatik.uni-freiburg.de/~thiemann/papers/,(2003).

MA, Hongmei et al., "Construction of English-Chinese bilingual interaction environment in virtual space teleconferencing system", Third International Conference on Virtual Reality and Its Application in Industry, Zhigeng Pan, Jiaoyind Shi, Editors, *Proceedings of SPIE* vol. 4756 (2003), (2003),165-171.

"U.S. Appl. No. 11/845,178 Office Action", Nov. 16, 2010, 18 Pages.

Holzwarth, Martin et al., "The Influence of Avatars on Online Consumer Shopping Behavior", *Journal of Marketing* vol. 70, American Marketing Association Oct. 2006, pp. 19-36.

Hostetler, Terry R. et al., "Strolling down the avenue with a few close friends", *Third Irish Workshop on Computer Graphics* Eurographics 2002 Mar. 2002, 8 pgs.

Isaacs, Ellen A. et al., "Microcosm: support for virtual communities via an on-line graphical environment", *CHI 98 conference summary on Human factors in computing systems* ACM, New York, NY, USA, pp. 5-6. DOI=10.1145/286498.286501 http://doi.acm.org/10.1145/286498.286501 1998.

"U.S. Appl. No. 11/845,178 Office Action", May 19, 2011, 23 pages.

Reynolds, Craig, "Interaction with Groups of Autonomous Characters", *Proceedings of Game Developers Conference* 2000, 12 pages.

"U.S. Appl. No. 11/845,178 Final Office Action", May 19, 2011.

"U.S. Appl. No. 12/032,203 Office Action", Mar. 11, 2011, 29 pages.

Reynolds, Craig "Interaction with Groups of Autonomous Characters", Proceedings of Game Developers Conference '00 Mar. 2000, pp. 449-460.

"U.S. Appl. No. 12/032,203 Final Office Action", Aug. 25, 2011, 24 pages.

"U.S. Appl. No. 11/845,178 Final Office Action", Apr. 18, 2012, 27 pages.

"U.S. Appl. No. 11/845,178 Final Office Action", Dec. 19, 2012, 23 pages.

"U.S. Appl. No. 11/845,178 Office Action", Aug. 31, 2012, 25 pages.

"U.S. Appl. No. 11/845,178 Office Action", Dec. 23, 2011, 13 pages.

* cited by examiner

US 9,110,890 B2

SELECTING A LANGUAGE ENCODING OF A STATIC COMMUNICATION IN A VIRTUAL UNIVERSE

BACKGROUND

Embodiments of the inventive subject matter relate generally to virtual universe systems, and, more particularly, to dynamic presentation of a translated static communication in a virtual universe. Virtual universe applications allow people to socialize and interact in a virtual universe. A virtual universe ("VU") is a computer based simulated environment intended for its residents to traverse, inhabit, and interact through the use of avatars. Many VUs are represented using 3-D graphics and landscapes, and are populated by many users, known as "residents." Other terms for VUs include metaverses and "3D Internet."

BRIEF SUMMARY

According to one embodiment of the inventive subject matter, a method comprises detecting a language encoding selection trigger for a static communication object with respect to an avatar in a virtual universe. The static communication object comprises a plurality of encodings of a static communication in a plurality of languages. A first language indicated for the avatar is determined. It is determined if the plurality of languages includes the first language. If the plurality of languages includes the first language, then a first of the plurality of encodings of the static communication in the first language is presented to the avatar.

BRIEF DESCRIPTION OF THE SEVERAL VIEWS OF THE DRAWINGS

The present embodiments may be better understood, and numerous objects, features, and advantages made apparent to those skilled in the art by referencing the accompanying drawings.

DETAILED DESCRIPTION

The description that follows includes exemplary systems, methods, techniques, instruction sequences and computer program products that embody techniques of embodiments. However, it is understood that the described embodiments may be practiced without these specific details. For instance, although examples refer to communications that transmit text or voice, other forms of communication may be used, like streaming media (e.g. voice or video), chats, music, etc. Various devices and communication protocols not mentioned can also be utilized, like tactile based communications devices (e.g., Braille devices), satellite transmissions, web-cam transmissions, graphical images that represent text, cartoon depictions, etc. In other instances, well-known instruction instances, protocols, structures and techniques have not been shown in detail in order not to obfuscate the description.

Virtual universes ("VU"s) have become increasingly popular for all types of entertainment and commerce. In a VU, a user account is represented by an avatar (e.g., a cartoon-like character, a life-like computer animation, etc.) that inhabits the VU. An avatar interacts with items and other avatars in the VU. Other avatars are represented either by other user accounts or by the VU programming. Items are created by other avatars or other VU programmers to interact with avatars. Avatars and some items communicate information within the VU. Information can also be communicated into the VU from an external source, from the VU system, etc.

Users from diverse backgrounds reside or interact within virtual universes. A translation mechanism can be implemented in virtual universes to facilitate communications between users who communicate with different languages (e.g., English, Spanish, Braille, American Sign Language, etc.). Communications typically are generated statically or dynamically. Examples of static communications include note cards, documents, billboards, a billboard that rotates through predefined text, logos on T-shirts, a predefined speech by an automated avatar, etc. Examples of dynamic communications include conversations between avatars, speech from a user's avatar, monologues, a billboard that displays a live feed of text, etc.

A static communication can be presented efficiently in different languages to facilitate propagation of the static communication beyond language boundaries. A static communication object that represents a static communication can be loaded with different language encodings of the static communication. When a trigger occurs (e.g., an avatar accesses the static communication object), a language encoding of the static communication that can be understood by the avatar is presented to the avatar. As the static communication propagates throughout the virtual universe, additional language encodings can be added to the static communication object.

Figure 1:
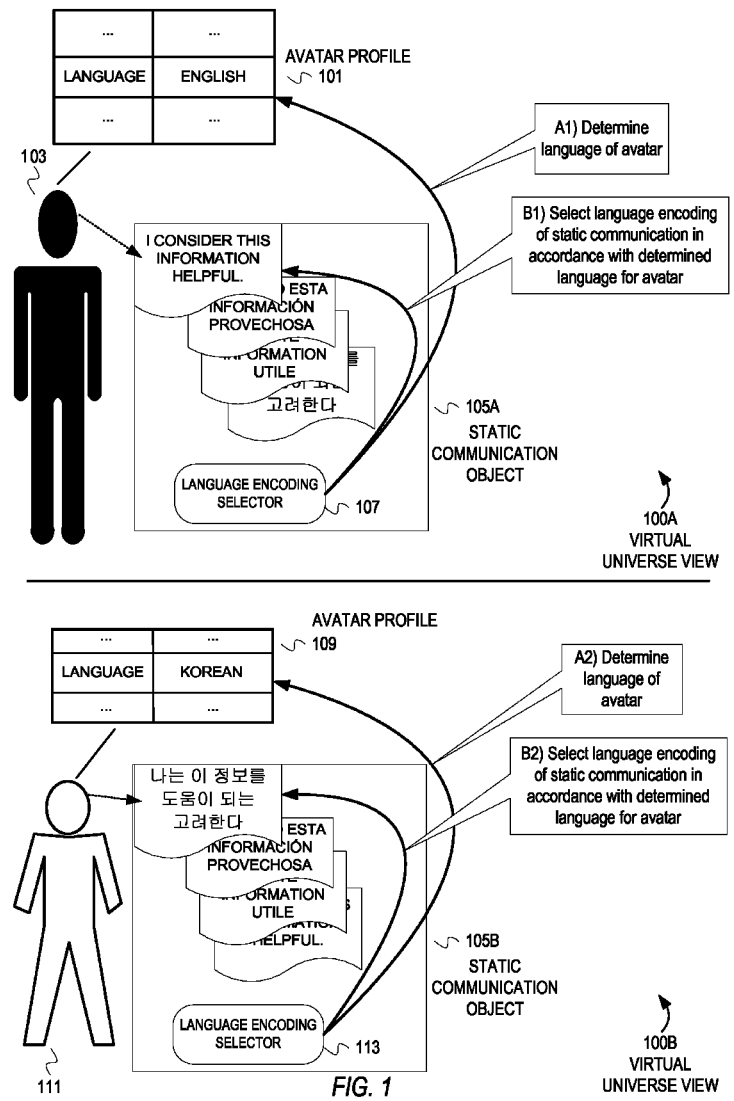
FIG. 1 depicts a conceptual diagram of an example presentation of a static communication in different language encodings with a static communication object in a virtual universe.

FIG. 1 depicts a conceptual diagram of an example presentation of a static communication in different language encodings with a static communication object in a virtual universe. A virtual universe view 100A depicts an avatar 103 consuming a static communication as represented by a static communication object 105A. The virtual universe view 100A is a view of a virtual universe from a perspective of the avatar 103 as rendered to a machine (e.g., computer, mobile phone, television, etc.) for presentation to a user of the machine. The avatar 103 is associated with an avatar profile 101. The avatar profile 101 indicates a language for the avatar 103. In FIG. 1, the avatar profile 101 indicates "English" as the language for the avatar 103. Although only one language is depicted, an avatar profile can indicate multiple languages for the avatar, and is not limited to spoken languages or "real" languages. The static communication object 105A comprises a language encoding selector 107 and encodings of a static communication in English, French, Spanish, and Korean. In English, the static communication reads "I consider this information helpful." At stage A1, the language encoding selector 107, reads the avatar profile 101 and determines a language for the avatar 103, which is English. At a stage B1, the language encoding selector 107 selects the English encoding of the static communication in accordance with the determined language for the avatar. The static communication object 105A presents the avatar 103 with the selected English encoding of the static communication.

In a virtual universe view 100B, an avatar 111 consumes a static communication object 105B. The relationship between the static communication objects 105A and 105B can vary. The static communication object 105B can be a copy of the static communication object 105A. The avatar 103 may have transferred the static communication object 105A to the avatar 111, so the static communication object 105B can be the static communication object 105A. For this illustration, it is assumed that the static communication object 105B is a copy of the static communication object 105A. The static communication object 105B comprises a language encoding selector 113, and encodings of the static communication in English, Korean, French, and Spanish. The avatar 111 is associated with an avatar profile 109 that indicates a language of Korean. At a stage A2, the language encoding selector 113 reads the avatar profile 109 to determine Korean as the language for the avatar 111. At a stage B2, the language encoding selector 113 selects the Korean encoding of the static communication for presentation to the avatar 111 in accordance with the language determined for the avatar 111.

Although the example depicted in FIG. 1 illustrates selection and presentation of a particular language encoding of a static communication, these operations do not necessarily occur in tandem. For example, a first avatar may transfer a static communication object to a second avatar. When the second avatar acquires the static communication object, the language encoding selector can select a language encoding by indicating (e.g., marking, setting a pointer, etc.) one of the language encodings for presentation to the second avatar. The second avatar, however, may not access or open the static communication object until a later time. When the second avatar chooses to read the static communication object, the appropriate language encoding has already been selected.

It should be understood that FIG. 1 depicts an example, and should not be used to limit embodiments of the inventive subject matter. Embodiments can implement a static communication object differently. An embodiment can implement the static communication object to comprise references to language encodings (e.g., memory addresses, storage addresses, identifiers, etc.). An embodiment can also implement a static communication object to literally comprise the language encodings. In addition, more than one language encoding can be indicated for presentation to an avatar. A static communication object can present multiple language encodings based on a rotation, time of day, priority, etc. Furthermore, the operations depicted in FIG. 1 should not be construed as limiting embodiments.

Figure 2:
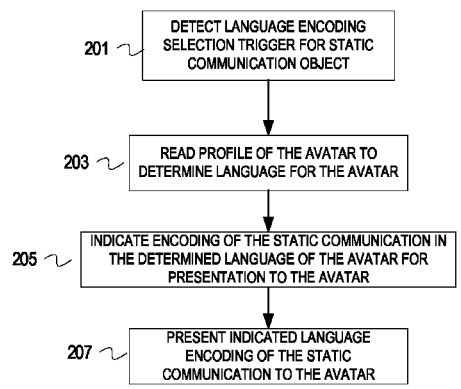
FIG. 2 depicts a flowchart of example operations for indicating a language encoding of a static communication for an avatar.

FIG. 2 depicts a flowchart of example operations for indicating a language encoding of a static communication for an avatar. At block 201, a language encoding selection trigger is detected for a static communication object. Examples of a language encoding selection trigger include threshold proximity of an avatar to a static communication object, access of the static communication object by an avatar, transferring the static communication object to an avatar, acquisition of the static communication object by an avatar, etc. At block 203, a profile of an avatar that caused the language encoding selection trigger is read. The avatar profile is read to determine one or more languages indicated for the avatar. At block 205, an encoding of the static communication in the language determined for the avatar is indicted or selected. Embodiment can indicate or select multiple language encodings of the static communication for presentation to the avatar as mentioned above. At block 207, the indicated language encoding of the static communication is presented to the avatar. Depending on the language encoding, examples of presenting the language encoding include rendering a sequence of images, playing audio, displaying text, supplying signals to a tactile communication device, etc.

The example operations depicted in the flowchart of FIG. 2 assume an encoding of the static communication in a language of the avatar will be available with the static communication object. Embodiments, however, can handle with the absence of an encoding in the avatar's language. An embodiment can leave a currently indicated encoding as the encoding to be presented. An embodiment can select an encoding in a language similar to the avatar's language. For example, a language encoding selector can select an available Romance language encoding of the static communication if an avatar's profile indicates a Romance language that is not available with the static communication object. An embodiment can also submit a request for translation of the static communication into the language of the avatar.

Figure 3:
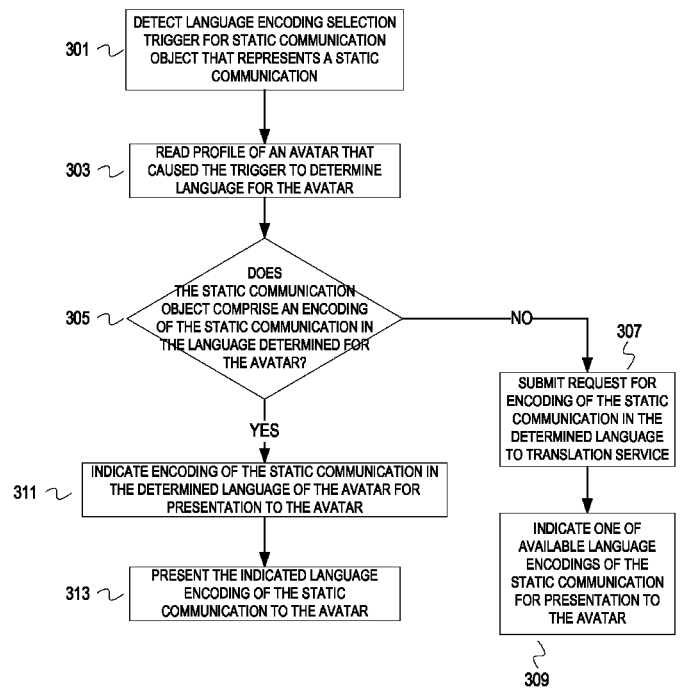
FIG. 3 depicts a flowchart of example operations that request translation of a static communication for an avatar.

FIG. 3 depicts a flowchart of example operations that request translation of a static communication for an avatar. At block 301, a language encoding selection trigger is detected for a static communication object that represents a static communication. At block 303, a profile of an avatar that caused the language encoding selection trigger is read to determine at least one language indicated for the avatar. At block 305, it is determined if the static communication object comprises an encoding of the static communication in a language determined for the avatar. If the static communication object does not comprise an encoding in the avatar's language, then control flows to block 307. If the static communication object comprises an encoding in a language of the avatar, then control flows to block 311.

At block 307, a request is submitted for a language encoding of the static communication in the determined language (or more if multiple languages are indicated for the avatar) of the avatar. The request can be submitted to one or more translation services, to a list of one or more avatars that communicate in the languages, posted to a bulletin board, etc. At block 309, one of the available language encodings is indicated for presentation to the avatar. An embodiment can also use logic or heuristics to select a similar language.

At block 311, an encoding of the static communication in the language determined for the avatar is indicated for presentation to the avatar. At block 313, the indicated language encoding is presented to the avatar.

Communications in a virtual universe are not limited to static communications. Avatars, and possibly items, dynamically communicate in virtual universes. Automatically modifying communications for different languages facilitates efficient communications within virtual universes.

Figure 4:
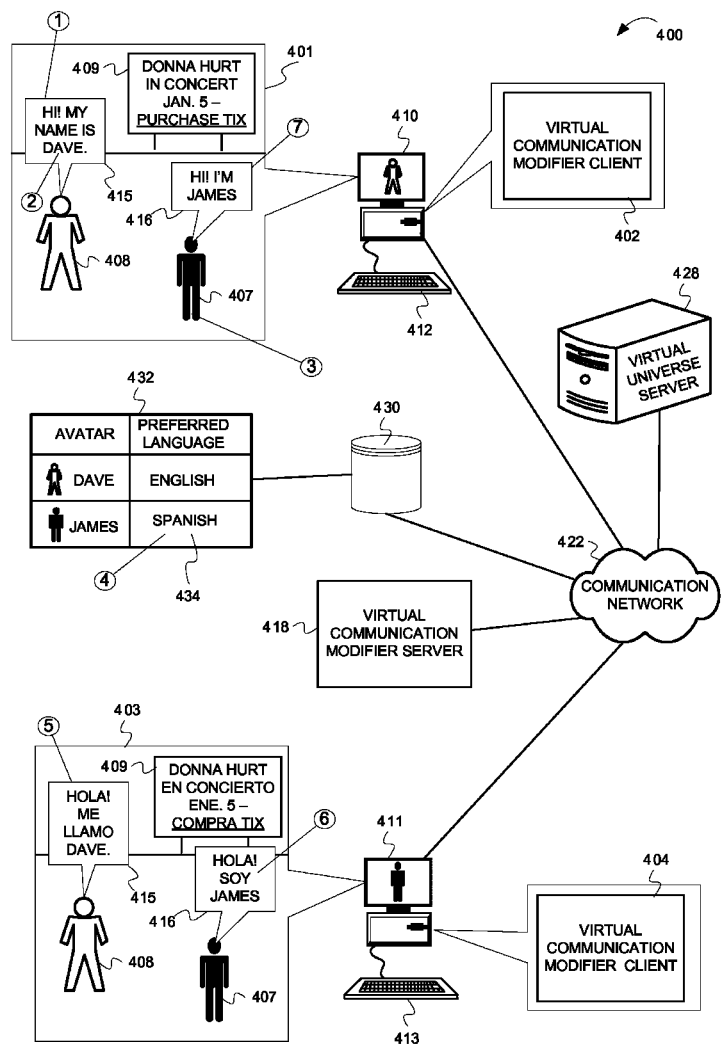
FIG. 4 is an example illustration of automatically modifying languages of virtual communications in a virtual universe.

FIG. 4 is an example illustration of automatically modifying languages of virtual communications in a virtual universe. In FIG. 4, a virtual communication modifier system 400 comprises one or more various devices connected via a communication network 422. One or more computer devices 410, 411 are connected to the communication network 422 to access a virtual universe server ("VU server") 428. The VU server 428 contains coding that the computer devices 410, 411 process to render images of virtual universe objects (e.g., avatars, items, background, environment, etc.) that make up one or more virtual universe rendering areas ("VU rendering areas") 401, 403, for example, on a monitor or screen associated with the respective computer devices 410, 411. The VU server 428 accesses data stored in a database 430. The data in the database 430 is related to user accounts. The user accounts represent account information that a user utilizes to access the VU server 428. Each user account is associated with an avatar, such as avatars 408 and 407. In FIG. 4, avatar 408 is controlled by input received from computer 410. Similarly, avatar 407 is controlled by input received from computer 411. Virtual communication modifier clients 402, 404 are associated with computers 410, 411 respectively. A virtual communication modifier server 418 is connected to the communication network 422 and works in conjunction with the virtual communication modifier clients 402, 404, and other network devices like the VU server 428 and the database 430, to automatically modify communications from, in, or intended for, the VU (i.e., "virtual communications").

The virtual communication modifier system 400, in stage "1", detects a virtual communication, such as talk bubble 415 or text presented on item 409. For instance, a keyboard 412 on the computer device 410 can be utilized to converse within the VU rendering area 401. The conversation text appears in the talk bubble 415 within the VU rendering area 401 in English as the avatar 408 speaks. In other examples, other devices can be utilized to communicate in the VU, such as microphones, tactile communication devices, telephones, etc.

The virtual communication modifier system 400, in stage "2", determines a language for the virtual communication. For example, the avatar 408 initiates the virtual communication 415 in English. The virtual communication modifier client 402 detects that the virtual communication 415 is in English by using one of many techniques. For instance, the virtual communication modifier client 402 could gather the contents of the talk bubble 415 and process it using language recognition software. Alternatively, the virtual communication modifier client 402, or the virtual communication modifier server 418, could read a user account associated with the avatar 108 to determine a preferred language for the user account. A database 430 could hold one or more records that store information about the user account, the avatar 408, and the preferred language of the user account. In some examples, an avatar may not be initiating a communication, but rather an inanimate item in the VU rendering area 401, like item 409 initiates a communication. The item 409 is an example of a virtual billboard that advertises an event in the VU as displayed in the VU rendering area 401 for avatar 408. The item 409 presents the textual information on the billboard by utilizing text written in a specific language. The virtual communication modifier client 402 can determine a language for the virtual communication intended by item 409 by querying the VU server 428 for a default language for the item 409. For example, the item 409 may have a record entry in the database 430 which contains metadata and settings regarding the item 409. One of the settings, or metadata, could include the default language for the text displayed on the item 409. Further, the item 409 may communicate in ways other than textual communication, such as using audible sounds.

The virtual communication modifier system 400, in stage "3", determines an avatar to whom the virtual communication is directed. For example, if the avatar 408 speaks the virtual communication in talk bubble 415, the virtual communication modifier client 402 could detect any indicators within the VU rendering area 401 that indicate whether the virtual communication is intended for avatar 407. For instance, the virtual communication modifier client 402 could detect a distance between the speaking avatar 408 and the nearest avatar 407. In other examples, the avatar 408 may indicate directly that the virtual communication is intended for avatar 407 (e.g., selecting the avatar 407 before speaking). In the case of the item 409, the virtual communication modifier system 400 can detect one or more avatars, such as avatars 408 and 407, that are within a specific viewing distance of the item 409. The virtual communication modifier system 400 could present the text on the item 409 as soon as one of the avatars 408 or 407 enters the viewing distance.

The virtual communication modifier system 400, in stage "4", determines a preferred language of the avatar to whom the virtual communication is directed. For example, where the avatar 408 is communicating with avatar 407, the virtual communication modifier system 400 queries the database 430 to find a database entry 432 pertaining to avatar 407 that includes a column 434 for the preferred language of the avatar 407. The virtual communication modifier system 400 determines from the database entry 432 that avatar 407 has a preferred language of Spanish.

The virtual communication modifier system 400, in stage "5", automatically converts the virtual communication into the preferred language for the avatar to whom the communication is directed. For example, the virtual communication modifier server 418 converts the text within the talk bubble 415 into Spanish. Likewise, the virtual communication modifier server 418 could convert the text on the item 409 into Spanish.

In some examples the text on the item 409 is predefined, and, therefore, could be stored on a server, such as the VU server 428, in several languages. The VU server 428 could determine which one of the stored encodings matches a preferred language for either of the avatars 407 and 408. The VU server 428 can send the appropriate stored encoding for display at a client (e.g., computers 410, 411). If one of the stored encodings is not appropriate for a particular user, then the virtual communication modifier system 400 could convert or translate the text on the item 409. The virtual communication modifier system 400 could perform a pre-fetch of a default encoding and wait to transmit until it had confirmed that default encoding matched a preferred language. If the preferred language did not match the pre-fetched default, then the virtual communication modifier system 400 could look up the correct encoding. Some communications may be predefined communications from avatars and other VU users, and not just from items like item 409. For example, the talk bubbles 415, 416 may contain predefined statements, audible sounds or phrases, or text that an avatar 408, 407 uses to communicate. The predefined communications may also be stored on the VU server 428 and be fetched or pre-fetched as just described above.

The virtual communication modifier server 418 passes the converted information to the virtual communication modifier client 404 to present in the VU rendering area 403 as seen by avatar 407 via computer 411. The talk bubble 415 appears in Spanish in the VU rendering area 403 while the talk bubble 415 appears in English within the VU rendering area 401. In the case of the item 409, the virtual communication modifier system 400 also presents the text for the item 409 in Spanish to avatar 407 within the VU rendering area 403. The virtual communication modifier system 400 presents the text for the item 409 in English to avatar 408 within the VU rendering area 401.

The virtual communication modifier system 400, in stage "6", detects a response communication from the avatar 407, such as talk bubble 416. The avatar 407 could respond utilizing the keyboard 413 to type text, or via other means, such as utilizing a microphone to speak words. The virtual communication modifier system 400 can detect audible communications utilizing spoken text recognition and conversion software. The virtual communication modifier system 400 could convert the spoken words into different formats, such as text. The virtual communication modifier system 400 then performs the process of automatically modifying the communication of talk bubble 416 by determining the preferred language for the avatar 408 and converting the communicated response from avatar 407 into the preferred language for avatar 408.

The virtual communication modifier system 400, in stage "7", presents the response communication (e.g., talk bubble 416) in the VU rendering area 401 for avatar 408. The virtual communication modifier system 400 presents the talk bubble 416 in the VU rendering area 401 in English for avatar 408 while at the same time the virtual communication modifier system 400 presents the talk bubble 416 in Spanish for avatar 407 in the VU rendering area 403. Consequently, the virtual communication modifier system 400 provides real-time, automatic modification of VU communications, such as converting the language of VU communications. Such automatic, real-time modification enables avatars to communicate with each other independent of differences in language and format used for communicating, thus allowing effective and efficient communication in a virtual universe.

Figure 5:
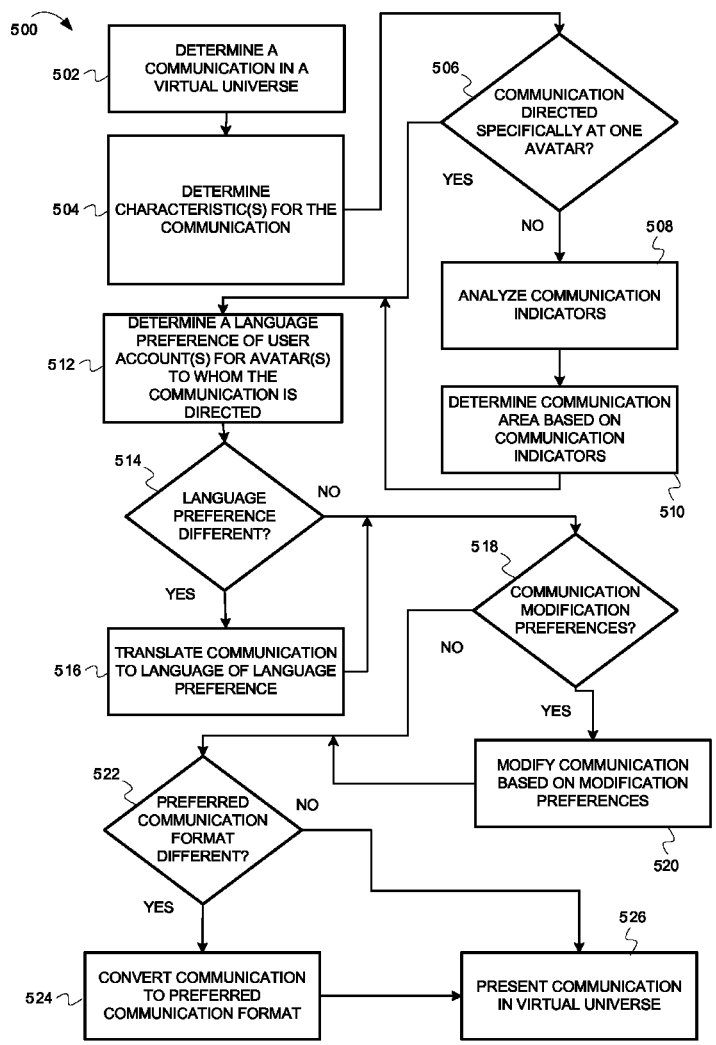
FIG. 5 is an example flow diagram illustrating automatically detecting and modifying virtual communications.
Figure 6:
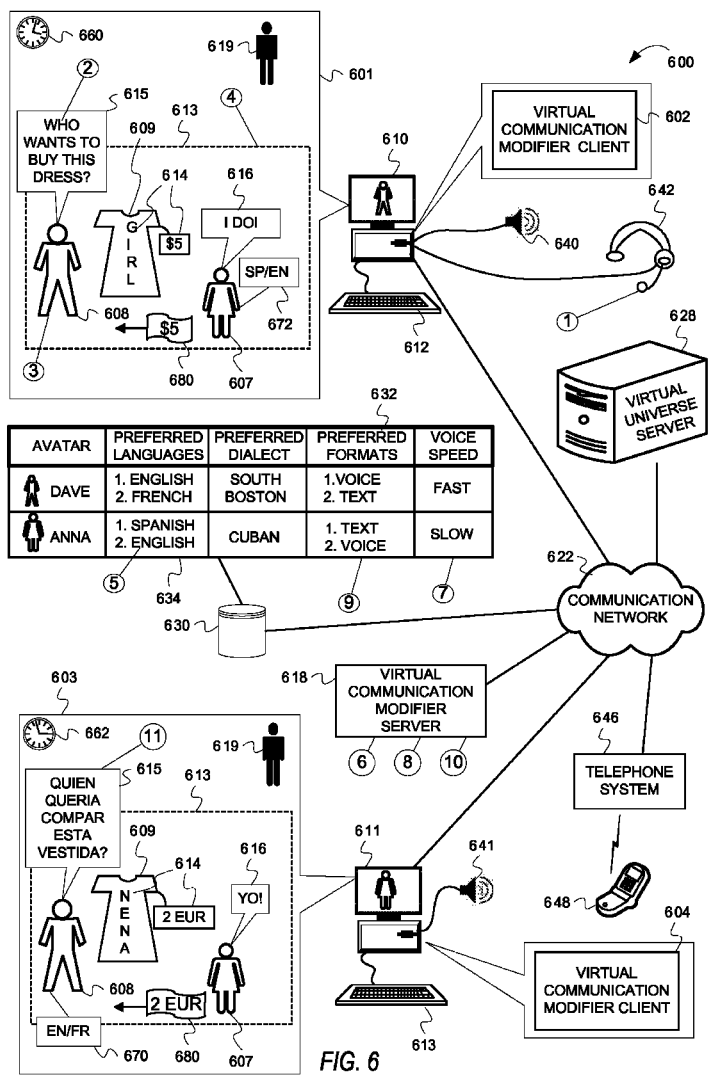
FIG. 6 is a conceptual diagram that illustrates an example of automatically detecting and modifying virtual communications in a virtual universe.

FIG. 5 is an example flow diagram illustrating automatically detecting and modifying virtual communications. FIG. 6 is a conceptual diagram that illustrates an example of automatically detecting and modifying virtual communications in a virtual universe. This description will present FIG. 5 in concert with FIG. 6.

In FIG. 5, the flow 500 begins at processing block 502, where a virtual communication modifier system determines a communication in a virtual universe ("virtual communication"). In FIG. 6 at stage "1", a virtual communication modifier system 600 detects a virtual communication, such as talk bubble 615 or text 614 associated with item 609. In FIG. 6, a virtual communication modifier system 600 comprises one or more devices connected via a communication network 622. One or more computer devices 610, 611 are connected to the communication network 622 to access a virtual universe server ("VU server") 628. The VU server 628 contains coding that the computer devices 610, 611 process to render images and objects within one or more virtual universe rendering areas ("VU rendering areas") 601, 603, for example on a monitor or screen associated with the respective computer devices 610, 611. In some examples, the computers 610, 611 may also have coding that the computers 610, 611 can process to render the VU rendering areas 601, 603. The VU server 628 accesses data stored in a database 630. The data in the database 630 is related to user accounts. Each user account is associated with an avatar, such as avatars 608 and 607. In FIG. 6, avatar 608 is controlled by input received from computer 610. Similarly, avatar 607 is controlled by input received from computer 611. Virtual communication modifier clients 602, 604 are associated with computers 610, 611 respectively. A virtual communication modifier server 618 is connected to the communication network 622 and works in conjunction with the virtual communication modifier clients 602, 604, and other network devices like the VU server 628 and the database 630, to automatically modify virtual communications.

Referring back to stage "1", the virtual communication modifier system 600 detects a virtual communication. For example, the avatar 608 initiates the virtual communication, as shown in talk bubble 615. The computer 610 may be connected to a headset 642 that receives voice input. The virtual communication modifier client 602 could detect the voice input and present the voice input from the speaker 640 on computer 610 or the speaker 641 on computer 611. At the same time, or alternatively, the virtual communication modifier client 602 could present a textual representation of the virtual communication within the talk bubble 615. Alternatively, or on combination with the headset 642, a keyboard 612 connected to the computer device 610 can be utilized to converse within the VU rendering area 601. Conversation text appears in the talk bubble 615 within the VU rendering area 601 as the avatar 608 converses within the VU rendering area 601. In other examples, other devices can be utilized to communicate in the VU. The VU rendering area 601 presents one or more items, like item 609, in the VU. The item 609 is an example of an item (e.g., a virtual dress) for sale within the VU. Avatar 608 may be selling the item 609 to any avatar interested in buying the item 609. The item 609 presents the text 614 like a textual design (e.g., the word "GIRL" displayed on the front of the item 609) or the price tag (the currency symbols "$5"), which indicates a price for the item 609. The item 609 has a unique universal identifier (UUID) associated with the item. Information, such as the text 614 can be stored in the database 630 and referenced by the UUID.

The flow 500 continues at processing block 504, where the virtual communication modifier system determines one or more characteristics of the virtual communication. In FIG. 6 at stage "2", the virtual communication modifier system 600 selects one or more characteristics of the communication, such as, but not limited to, the following: language (e.g., English, Spanish, etc.), language dialect (Mexican Spanish versus Columbian Spanish), format (e.g., text, audio, visual, electronic, etc.), voice speed (e.g., fast versus slow), voice tone (male versus female, husky versus soft, etc.), formality of language (slang versus proper grammar), text type or size (e.g., large font versus small font, serif versus sans serif, etc.) or other characteristics not listed. For example, the virtual communication modifier system 600 detects that the value of the language characteristic of the virtual communication 615 is "English". The virtual communication modifier system 600 detects the characteristic by using one of many techniques. For instance, the virtual communication modifier client 602 could gather the contents of the talk bubble 615 and process the contents using language recognition software. Alternatively, the virtual communication modifier client 602, or the virtual communication modifier server 618, could read a user account associated with the avatar 608 to determine a preferred language for the user account. The database 630 could hold one or more records that store information about the user account, the avatar 608, and the preferred language of the user account. The virtual communication modifier client 602 could determine other characteristics, such as format, voice speed, etc. by processing the input for the virtual communication. For instance, if a user presses a key combination on the keyboard 612 to indicate that the user is about to converse on behalf of the avatar 608, the virtual communication modifier client 602 recognizes the key combination and determines that the virtual communication will be textual. A different key combination may indicate that the virtual communication will be audio. The virtual communication modifier client 602 can record the spoken words as audio signals within an audio file. The virtual communication modifier client 602 can then process the audio signals, such as with the assistance of the virtual communication modifier server 618, using language recognition software or devices. The virtual communication modifier client 602 can also store any text inputs from the keyboard 612 in a text file within the memory of the computer 610 and analyze the text using language recognition software. The virtual communication modifier client 602, and/or the virtual communication modifier server 618, may utilize other software or devices to detect other characteristics of the audio signals (e.g., voice speed, dialect, tone) or text (e.g., formality of language). In some examples, the avatar 608 may utilize a virtual universe item in conjunction with a virtual communication, such as item 609. The text 614 on the item 609 could be written in a specific language, such as English, with currency symbols representative of United States dollars. The virtual communication modifier client 602 can determine a language for the text 614 by querying the VU server 628 for a default language for the item 609. For example, the item 609 may have a record entry in the database 630 which contains settings, values, etc. regarding the item 609. One of the settings or values could include the default language for the text 614 displayed on the item 609.

The flow 500 continues at processing block 506, where the virtual communication modifier system determines whether the communication is directed specifically at one avatar. In FIG. 6 at stage "3", the avatar 608 speaks the virtual communication in talk bubble 615 and the virtual communication modifier client 602 attempts to detect any indicators by the avatar 608 that indicate whether the virtual communication is intended for the single avatar 607, or for a group of avatars. For example, the virtual communication modifier system 600 detects whether the avatar 608 follows a VU protocol for selecting an avatar 607 before speaking to the avatar 607. If no such protocol has been detected, for instance, the virtual communication modifier system 600 determines that the communication is not directed specifically at one avatar. Consequently, referring back to FIG. 5, the process would continue at block 508. Otherwise, if the virtual communication modifier system determines that communication is directed specifically at one avatar, the process would continue at block 512.

The flow 500 continues at processing block 508, where the virtual communication modifier system analyzes communication indicators. In FIG. 6 at stage "4", the virtual communication modifier system 600 analyzes communication indicators that indicate to which avatars the virtual communication is directed. Some indicators include, but are not limited to, a direction of an avatar's view, gestures made by an avatar, an affinity or relationship of the avatar to another avatar, a distance between avatars, virtual universe settings and protocols regarding communication between avatars in the virtual universe, etc. For instance, the virtual communication modifier client 602 could detect a virtual distance between the speaking avatar 608 and the nearest avatar 607. Virtual distances can be geographic or Euclidean distances between avatar 608 and any other object in the VU. Virtual distances can be measured and set according to rules within the VU that dictate communication ranges for both visual and audible communications.

The flow 500 continues at processing block 510, where the virtual communication modifier system determines a communication area based on the communication indicators. In FIG. 6, still referring to stage "4", the virtual communication modifier system 600 determines a boundary 613, which encompasses an area of the VU surrounding the communicating avatar 608. The area encompassed by the boundary 613 represents an "earshot" distance within the VU, determined by VU rules or set by user preferences, indicating a set communication range for a spoken communication of the avatar 608. Any avatars within the spoken communication boundary 613 can see the talk bubble 615 inside of the VU. For instance, computer 610 renders the VU rendering area 601 to present the talk bubble 615. Other avatars, like avatar 619, outside of the boundary 613, would not see the talk bubble 615. The VU, however, may still have different rules regarding items, such as item 609. Although the avatar 619 may be outside of the avatar's spoken communication boundary 613, the avatar 619 may still be able to see the item 609, which may be contained within a larger boundary for viewable communications, like text on an item 609.

The flow 500 continues at processing block 512, where the virtual communication modifier system determines the language preference of user accounts for avatars to whom the communication is directed. In FIG. 6 at stage "5", the virtual communication modifier system 600 determines a preferred language of the avatar to whom the virtual communication is directed. For example, the avatar 608 is communicating with avatar 607, and, thus, the virtual communication modifier system 600 queries the database 630 to find a database entry 632 pertaining to avatar 607 that includes a column 634 for the preferred language of the avatar 607. The virtual communication modifier system 600 determines from the database entry 632 that avatar 607 has a preferred language of Spanish. The avatar 607 may have a ranked list of preferred languages.

The flow 500 continues at processing block 514, where the virtual communication modifier system determines whether the language indicated in the user preference is different from the actual language value of the communication. In FIG. 6, still at stage "5", the virtual communication modifier system 600 compares the language value (i.e. "English") of the virtual communication from talk bubble 615 in VU rendering area 601 and determines that is it different from the preferred language value (i.e. Spanish) shown in column 634 for avatar 607. If the languages values were the same, the processes would have continued at block 518. However, because the languages values were different, the process continues at block 516.

The flow 500 continues at processing block 516, where the virtual communication modifier system translates the virtual communication to the language value indicated in the user preference. In FIG. 6 at stage "6", the virtual communication modifier server 618 automatically performs a conversion process that copies the text contents of the talk bubble 615 from English to Spanish. The virtual communication modifier server 618 stores the converted text in temporary memory as the process continues. Likewise, the virtual communication modifier server 618 could convert the text on the item 609 into Spanish and store the converted text in memory. If the virtual communication is audio based, then the virtual communication modifier server 618 can convert an audio file of the virtual communication from spoken English into an audio file of spoken Spanish.

The flow 500 continues at processing block 518, where the virtual communication modifier system determines whether communication modification preferences are specified in the user account. In FIG. 6 at stage "7", the virtual communication modifier system 600 queries the database 630 to determine whether the user account for avatar 607 includes preferences related to other communication characteristics that can be modified. Other modifiable characteristics include a language dialect, voice speed, voice tone, formality of language, text type or size, etc., for all of which the database entry 632 may have a set preference. For example, the user associated with avatar 608 may communicate using the headset 642 to generate a spoken virtual communication. The spoken communication, however, may be very fast, as the user may speak very fast. The virtual communication modifier server 618, however, can analyze the speech pattern of the spoken communication and compare it to the preferred voice speed indicated in database entry 632. The database entry 632 indicates that avatar 607 has a preference to receive slow speech communications via the VU. If communication modification preferences are specified, then the process continues at block 520. If communication modification preferences are not specified, then the process continues at block 522.

The flow 500 continues at processing block 520, where the virtual communication modifier system modifies the virtual communication based on the communication preferences. In FIG. 6 at stage "8", the virtual communication modifier server 618 processes the additional preferences. For example, the virtual communication modifier server 618 can slow a speed playback for a spoken virtual communication. The virtual communication modifier server 618 can slow voice speed, for instance, by recording the time from a first clock 660 associated with the computer 610 to determine a duration for the audio file associated with the spoken virtual communication. The virtual communication modifier server 618 can then reference a second clock 662 associated with the computer 611. During playback of the audio file, the virtual communication modifier server 618 can slow processing of the audio file measured by the second clock 662 to generate a slow playback speed for the audio file.

The flow 500 continues at processing block 522, where the virtual communication modifier system determines whether a preferred communication format is indicated in the user account preferences and if the preferred communication format is different from the format of the virtual communication. A communication format includes the structure of the communication, such as whether it contains text components, audio components, special visual components besides text, musical components, electronic enhancement or variations, etc. In FIG. 6, at stage "9", the virtual communication modifier server 618 looks for a preferred format preference in the database entry 632. The database entry 632 includes a preferred format for avatar 607. For instance, avatar 607 prefers textual communications over voice communications. The virtual communication modifier system 600 can convert voice to text or text to voice depending on the user account preference. If the preferred format is different than the format of the virtual communication, then the process continues at block 524. If the preferred format is not different from the format of the virtual communication, then the process continues at block 526.

The flow 500 continues at processing block 524, where the virtual communication modifier system converts the virtual communication to the preferred communication format. In FIG. 6 at stage "10", the virtual communication modifier server 618 converts any audio elements of the virtual communication from talk bubble 615 into text.

The flow 500 continues at processing block 526, where the virtual communication modifier system presents the virtual communication in the virtual universe according to the preferences in the user account. If the preferences have indicated differences in language, format, or other modifiable characteristics, then the virtual communication modification system presents the virtual communication in a modified format, either with a language conversion, a format conversion, some other modification, or any combination thereof. In FIG. 6 at stage "11", the virtual communication modifier system 600 presents the modified virtual communications to the avatar 607 in the VU rendering area 603 as seen by avatar 607 via computer 611. The talk bubble 615 in the VU rendering area 603 includes text in Spanish. If the communication was spoken, and the user account for avatar 607 had other preferences, like voice speed variation, then the virtual communication modifier server 618 passes the modified voice file to the virtual communication modifier client 604 to present the modified voice file through the speaker 641. The virtual communication modifier system 600 also presents text 614 associated with item 609 in a converted format. As shown in VU rendering area 603, the text 614 is in Spanish. The textual design on the dress reads "NIÑA", which is a Spanish word for "GIRL". The virtual communication modifier system 600 can also convert text 614 on the tag for the item 609 from one currency format into another. For example, if the user account for avatar 607 includes a preference for currency presentation (e.g., Euros instead of US dollars), then the virtual communication modifier server 618 can convert the currency symbols and make numerical conversions for currency, to present a different currency symbol in the VU rendering area 603. If the avatar 607 conducts a business transaction, such as passing an amount of virtual currency 680 to the avatar 608, then the virtual communication modifier server 618 can also perform currency conversions and present the amount to the avatar 608, in VU rendering area 603, in preferred currency symbols. The VU rendering area 601, as seen by avatar 608, simultaneously presents all information in English, the preferred language preference for the user account associated with avatar 608. The avatar 607 can respond with virtual communications as well, such as talk bubble 616. The user associated with avatar 607 may utilize the keyboard 613 or other means to converse, (e.g., avatar 607 converses in Spanish using computer 611). The virtual communication modifier system 600 detects the response communication from the avatar 607 then performs the flow 500 for the virtual communications by avatar 607 to automatically modify the virtual communications and present them to avatar 608 in the VU rendering area 601 (e.g., the avatar 608 sees the talk bubble 616 in English). The flow 500 can be performed for multiple avatars at a time. For example, the virtual communication modifier system 600 could present the same virtual communication from avatar 608 to multiple avatars, not just 607. The virtual communication modifier system 600 would read the user account preferences for all of the avatars to ensure that all avatars receive the virtual communications according to their preferences.

In some embodiments, the virtual communication modifier system 600 can make preferences accessible to other avatars or entities. For instance, the virtual communication modifier system 600 can provide visible tags that indicate an avatar's preferences, such as a preferred language. For example, avatar 607 has a visible tag 672 that indicates the preferred languages in order of preference (e.g., SP/EN for "Spanish/English"). The virtual communication modifier system 600 can read the preferences from data in the database entry 632 that pertains to the avatar 607. The avatar 608 can see the visible tag 672 within the VU rendering area 601. The avatar 608 also has a visible tag 670 that indicates the preferred languages for avatar 608. The avatar 607 can see the visible tag 670 within the VU rendering area 603. The virtual communication modifier system 600 can also make preferences accessible via search or query capabilities. User accounts can include settings that indicate what preferences can be accessed so that avatars can specify the accessibility of the characteristics (e.g. private versus public, blocked versus viewable, etc.).

In some embodiments, the operations described in FIG. 5 and FIG. 6 can be performed in series, while in other embodiments, one or more of the operations can be performed in parallel. For example the blocks 514 through 524 can be performed in different order than those described.

Referring now to FIG. 6, in some embodiments, the virtual communication modifier system 600 modifies communications received from outside the VU and presents them in the VU. For example, a user could utilize a telephone 648, via a telephone system (e.g., wireless, land line, VOIP, etc.). The virtual communication modifier system 600 can receive communications from the telephone 648 and present them within the VU rendering area 601 or 603. The virtual communication modifier system 600 can also modify the communications from the telephone 648 by converting languages, converting voice to text, modifying voice or text characteristics, etc. in the same way that the virtual communication modifier system 600 modified communications for intra-VU communications. The virtual communication modifier system 600 can read from user account preferences, like those in database entry 632, to modify the communications from the telephone 648. Alternatively, the virtual communication modifier system 600 can process virtual communications from the VU and present them outside of the VU. For example, the virtual communication modifier system 600 can modify the contents of talk bubble 615 and send the information to the telephone 648. The virtual communication modifier system 600 can modify the content of the talk bubble 615 by converting text to voice, and sending a voice signal through the telephone 648 so that an audible voice is presented on the telephone 648. Further, the virtual communication modifier system 600 can store contact information and preferences for others outside of the VU who wouldn't have a user account in the VU. The preferences could include preferred languages, communication formats and characteristics for the extra-VU parties. The virtual communication modifier system 600 can present communications from inside the virtual universe and outside the virtual universe in a group setting, such as a conference call, wherein some group participants provide communications from inside the VU and others provide communications outside of the VU.

In some embodiments, the virtual communication modifier system 600 permits queries to the database 630 so that avatars can ascertain another avatar's preferred method of communication. For example, avatar 608 may query the database 630 and determine that avatar 607 prefers communications in Spanish. Consequently, the avatar 608 may prefer to communicate originally in Spanish, to avoid any potential translation errors or delays.

In some embodiments, the virtual communication modifier system 600 can determine a common language for groups of avatars. For instance, several avatars may be gathered together for a meeting, a social gathering, or other event. The virtual communication modifier system 600 may detect which language is common among all, or most, of the event participants and broadcast the virtual communications of the event in the common language.

In some embodiments, the virtual communication modifier system 600 can detect and utilize constructed or artificial languages (e.g., lingo, slang, combined dialects, coded speech, group speak, abbreviated speech, etc.). For example, a couple of avatars may indicate that a conversation should be translated to a lingo that only some avatars may understand, such as "web chat" lingo. The virtual communication modifier system 600 therefore converts the conversation into the artificial language. The virtual communication modifier system 600 can convert the conversation into the artificial language, even though the conversing avatars may be actually conversing in a non-artificial, or natural, language. This is especially beneficial for group scenarios where a group of people may understand a specific artificial language and wish to isolate the group of speakers in the VU to provide a level of group security or establish a semi-private group setting.

In some embodiments, the virtual communication modifier system 600 can automatically detect and add languages to the user account preferences when the system discovers that an avatar understands or uses a language that isn't already in the user account preferences. Further, the virtual communication modifier system 600 can include other user preferences not listed above, such as a time to use automatic modification services, a location to use automatic modification services, a threshold distance between avatars to indicate communication ranges and other preferences, such as that a user can understand a language when written, but not when spoken.

It should be understood that the depicted flowchart are examples meant to aid in understanding embodiments and should not be used to limit embodiments or limit scope of the claims. Embodiments may perform additional operations, fewer operations, operations in a different order, operations in parallel, and some operations differently. For instance, referring to FIG. 2, the indicated language encoding of the static communication may not be presented until a later time or by a separate entity (e.g., a different piece of code, module, unit, etc.). Additional operations can also be performed. For example, with reference to FIG. 2 again, additional operations can be performed to reveal at least some of the other language encodings to an avatar. Operations can be performed to allow a user to select a different language encoding of the static communication for presentation despite the avatar profile. Embodiments can also perform operations to concurrently display different language encodings to an avatar.

Embodiments of the inventive subject matter may be provided as a computer program product, or software, that may include a machine-readable medium having stored thereon instructions (e.g., firmware, resident software, micro-code, etc.), which may be used to program a computer system (or other electronic device(s)) to perform a process(es) according to embodiments, whether presently described or not since every conceivable variation is not enumerated herein. A machine readable medium includes any mechanism or article of manufacture for storing "machine-readable storage medium" or transmitting (machine-readable singnal medium" information in a form (e.g., software, processing application) readable by a machine (e.g., a computer, a mobile phone, etc.). The machine-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing executable instructions. In addition, machine-readable signal medium embodiments may be embodied in an electrical, optical, acoustical or other form of propagated signal (e.g., carrier waves, infrared signals, digital signals, etc.), or wireline,wireless, or other communications medium.

Computer program code for carrying out operations of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

It will be understood that each block of the above flowchart illustrations and/or block diagrams, combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present inventive subject matter. In this regard, each block in the flowchart or block diagrams may represent a module, segment, or portion of code, which comprises one or more executable instructions for implementing the specified logical function(s).

Figure 7:
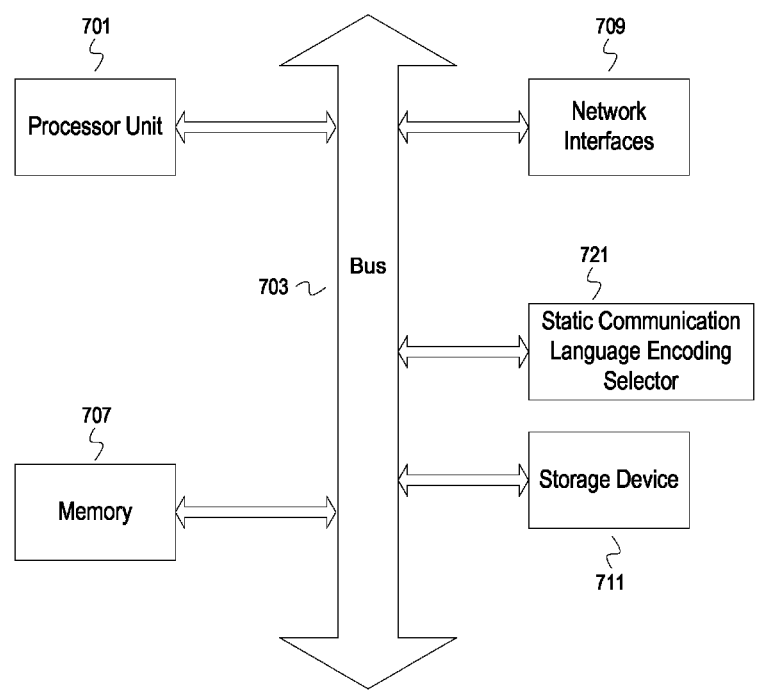
FIG. 7 depicts an example computer system.

FIG. 7 depicts an example computer system. A computer system includes a processor unit 701 (possibly including multiple processors, multiple cores, multiple nodes, and/or implementing multi-threading, etc.). The computer system includes memory 707. The memory 707 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) and/or any one or more of the above already described possible realizations of machine-readable media. The computer system also includes a bus 703 (e.g., PCI, ISA, PCI-Express, HyperTransport®, InfiniBand®, NuBus, etc.), a network interface 709 (e.g., an ATM interface, an Ethernet interface, a Frame Relay interface, SONET interface, wireless interface, etc.), and a storage device(s) 711 (e.g., optical storage, magnetic storage, etc.). The computer system also includes a static communication language encoding selector 721 that performs the functionalities for selecting a language encoding of a static communication object in a language for an avatar in a virtual universe. Some or all of the functionality performed by the static communication language encoding selector 721 can be implemented with an application specific integrated circuit, in logic implemented in the processing unit 701, in a co-processor on a peripheral device or card, etc. Moreover, some or all of the functionality performed by the static communication language encoding selector 721 can be embodied in code stored on one or more of the memory 707, the processor unit 701, a co-processor, and the storage device 711. Further, realizations may include fewer or additional components not illustrated in FIG. 7 (e.g., video cards, audio cards, additional network interfaces, peripheral devices, etc.). The processor unit 701, the storage device(s) 711, the static communication language encoding selector 721, and the network interface 709 are coupled to the bus 703. Although illustrated as being coupled to the bus 703, the memory 707 may be coupled to the processor unit 701.

While the embodiments are described with reference to various implementations and exploitations, it will be understood that these embodiments are illustrative and that the scope of the inventive subject matter is not limited to them. In general, techniques for selecting a language encoding of a static communication as described herein may be implemented with facilities consistent with any hardware system or hardware systems. Many variations, modifications, additions, and improvements are possible. For instance, embodiments can implement functionality at both client and server for selection of a language encoding based on proximity threshold of an avatar. To illustrate, a static communication object represents a novel in a book store in the virtual universe. An agent at the server monitors a viewing area proximate to the static communication object. When an avatar enters the proximate viewing area, a language encoding selector at the server reads the profile of the avatar and selects a language encoding of the novel accordingly. Hence, the virtual universe server can present three different language encodings of the same novel to avatars that communicate in three different languages as it sits on a shelf in the virtual universe book store. If each of these avatars acquire the novel, then different instances of the static communication object at clients of the respective avatars will maintain the language encodings.

The corresponding structures, materials, acts, and equivalents of all means or step plus function elements in the claims below are intended to include any structure, material, or act for performing the function in combination with other claimed elements as specifically claimed. The description of the present embodiments has been presented for purposes of illustration and description, but is not intended to be exhaustive or limited to the embodiments in the form disclosed.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the example configurations may be implemented as a combined structure or component. Similarly, structures and functionality presented as a single component may be implemented as separate components. These and other variations, modifications, additions, and improvements may fall within the scope of the inventive subject matter.

The invention claimed is:

1. A method comprising:
   detecting that a plurality of avatars in a virtual universe are within viewing distance of a static communication object within the virtual universe, wherein the static communication object has only a single static communication consisting of a single phrase encoded in a plurality of languages;
   determining a first language indicated for a first avatar of the plurality of avatars and a second language indicated for a second avatar of the plurality of avatars;
   determining that the plurality of encodings of the static communication include a first encoding of the static communication in the first language and a second encoding of the static communication in the second language;
   transmitting the first encoding of the static communication to a first device, which corresponds to the first avatar, for the first device to render the static communication object with the first encoding of the static communication in the first language; and
   transmitting the second encoding of the static communication in the second language to a second device, which corresponds to the second avatar, for the second device to render the static communication object with the second encoding of the static communication in the second language.

2. The method of claim 1 further comprising:
   determining a third language indicated for a third avatar of the plurality of avatars;
   determining that the plurality of encodings of the static communication does not include an encoding in the third language;
   translating one of the plurality of encodings into the third language to generate a third encoding of the static communication in the third language;
   associating the third encoding of the static communication in the third language with the static communication object; and transmitting the third encoding of the static communication in the third language to a third device, which corresponds to the third avatar, for the third device to render the static communication object with the third encoding of the static communication in the third language.

3. The method of claim 2, wherein said associating the third encoding of the static communication with the static communication object comprises at least one of modifying the static communication object to include the third encoding and modifying the static communication object to reference the third encoding of the static communication.

4. The method of claim 1, wherein the static communication object referentially comprises the plurality of encodings or literally comprises the plurality of encodings.

5. The method of claim 1, wherein said detecting that the plurality of avatars are within virtual viewing distance of the static communication object comprises detecting at least one of: one of the plurality avatars acquiring the static communication object, one of the plurality of avatars accessing the static communication object, and the plurality of avatars entering a viewing area for the static communication object.

6. A method comprising:
  detecting that a plurality of avatars in a virtual universe are within viewing distance of a static communication object within the virtual universe, wherein the static communication object has only a single static communication consisting of a single phrase encoded in a plurality of languages;
  determining a first language indicated for a first avatar of the plurality of avatars and a second language indicated for a second avatar of the plurality of avatars;
  determining that the plurality of encodings of the static communication include a first encoding of the static communication in the first language and that the plurality of encodings does not include an encoding of the static communication in the second language;
  transmitting the first encoding of the static communication to a first device, which corresponds to the first avatar, for the first device to render the static communication object with the first encoding of the static communication in the first language;
  translating one of the plurality of encodings into the second language to generate a second encoding of the static communication in the second language;
  associating the second encoding of the static communication in the second language with the static communication object; and
  transmitting the second encoding of the static communication in the second language to a second device, which corresponds to the second avatar, for the second device to render the static communication object with the second encoding of the static communication in the second language.

7. The method of claim 6, wherein said associating the second encoding of the static communication with the static communication object comprises at least one of modifying the static communication object to include the second encoding and modifying the static communication object to reference the second encoding.

8. The method of claim 6, wherein the static communication object represents at least one of a virtual document, a virtual note card, a virtual billboard, a virtual t-shirt, a virtual novel, and a virtual predefined speech.

9. At least one non-transitory machine-readable storage media having encoded therein a computer program product that comprises:

computer-readable program instructions executable by a set of one or more processor units, the computer-readable program instructions configured to,
  detect that a plurality of avatars in a virtual universe are within viewing distance of a static communication object within the virtual universe, wherein the static communication object has only a single static communication consisting of a single phrase encoded in a plurality of languages;
  determine a first language indicated for a first avatar of the plurality of avatars and a second language indicated for a second avatar of the plurality of avatars;
  determine that the plurality of encodings of the static communication includes a first encoding of the static communication in the first language and a second encoding of the static communication in the second language;
  transmit the first encoding of the static communication to a first device, which corresponds to the first avatar, for the first device to render the static communication object with the first encoding of the static communication in the first language; and
  transmit the second encoding of the static communication in the second language to a second device, which corresponds to the second avatar, for the second device to render the static communication object with the second encoding of the static communication in the second language.

10. The at least one non-transitory machine-readable storage media of claim 9, wherein the computer-readable program instructions are further configured to:
  determine a third language indicated for a third avatar of the plurality of avatars;
  determine that the plurality of encodings of the static communication does not include an encoding of the static communication in the third language; and
  generate a third encoding of the static communication in the third language;
  associate the third encoding of the static communication in the third language with the static communication object;
  transmit the third encoding of the static communication to a third device, which corresponds to the third avatar, for the third device to render the static communication object with the third encoding of the static communication in the third language.

11. The at least one non-transitory machine-readable storage media of claim 10, wherein the computer-readable program instruction configured to associate the third encoding of the static communication in the third language with the static communication object comprises at least one of computer-readable program instructions to modify the static communication object to include the third encoding and modify the static communication object to reference the third encoding.

12. The at least one non-transitory machine-readable storage media of claim 9, wherein the static communication object referentially comprises the plurality of encodings or literally comprises the plurality of encodings.

13. The at least one non-transitory machine-readable storage media of claim 9, wherein the computer-readable program instructions configured to detect that the plurality of avatars are within viewing distance of the static communication object comprises computer-readable program instructions configured to, at least one of, detect that at least one of the plurality of avatars acquiring the static communication object, detect that at least one of the plurality of avatars accessing the static communication object, and detect the plurality of avatars entering a viewing area for the static communication object.

14. An apparatus comprising:
a set of one or more processor units;
a set of one or more network interfaces operable to transmit and receive data for a virtual universe; and
a static communication language encoding selector operable to,
  detect that a plurality of avatars within the virtual universe are within viewing distance of a static communication object in the virtual universe, wherein the static communication object has only a single static communication consisting of a single phrase encoded in a plurality of languages;
  determine a first language indicated for a first avatar of the plurality of avatars and a second language indicated for a second avatar of the plurality of avatars;
  determine that the plurality of encodings of the static communication includes a first encoding of the static communication in the first language and a second encoding of the static communication in the second language;
  transmit the first encoding of the static communication to a first device, which corresponds to the first avatar, for the first device to render the static communication object with the first encoding of the static communication in the first language; and
  transmit the second encoding of the static communication in the second language to a second device, which corresponds to the second avatar, for the second device to render the static communication object with second encoding of the static communication in the second language.

15. The apparatus of claim 14, wherein the static communication language encoding selector is further operable to:
  determine a third language indicated for a third avatar of the plurality of avatars;
  determine that the plurality of encodings does not include an encoding of the static communication in the third language;
  request a translation of the static communication into the third language which yields a third encoding of the static communication in the third language;
  associate the third encoding with the static communication object; and
  transmit the third encoding to a third device, which corresponds to the third avatar, for the third device to render the static communication object with the third encoding of the static communication in the third language.

16. The apparatus of claim 14 further comprising a non-transitory computer readable storage medium that embodies the static communication language encoding selector.

17. The apparatus of claim 15, wherein the static communication language encoding selector being operable to associate the third encoding of the static communication with the static communication object comprises the static communication language encoding selector being operable to at least one of modify the static communication object to include the third encoding and modify the static communication object to reference the third encoding of the static communication.

18. The apparatus of claim 14, wherein the static communication object referentially comprises the plurality of encodings or literally comprises the plurality of encodings.

19. The apparatus of claim 14, wherein the static communication language encoding selector being operable to detect that the plurality of avatars are within virtual viewing distance of the static communication object comprises the static communication language encoding selector being operable to detect at least one of: one of the plurality of avatars acquiring the static communication object, one of the plurality of avatars accessing the static communication object, and the plurality of avatars entering a viewing area for the static communication object.

20. The apparatus of claim 14, wherein the static communication object represents at least one of a virtual document, a virtual note card, a virtual billboard, a virtual t-shirt, a virtual novel, and a virtual predefined speech.

* * * * *